United States Patent Office 3,486,094
Patented Dec. 23, 1969

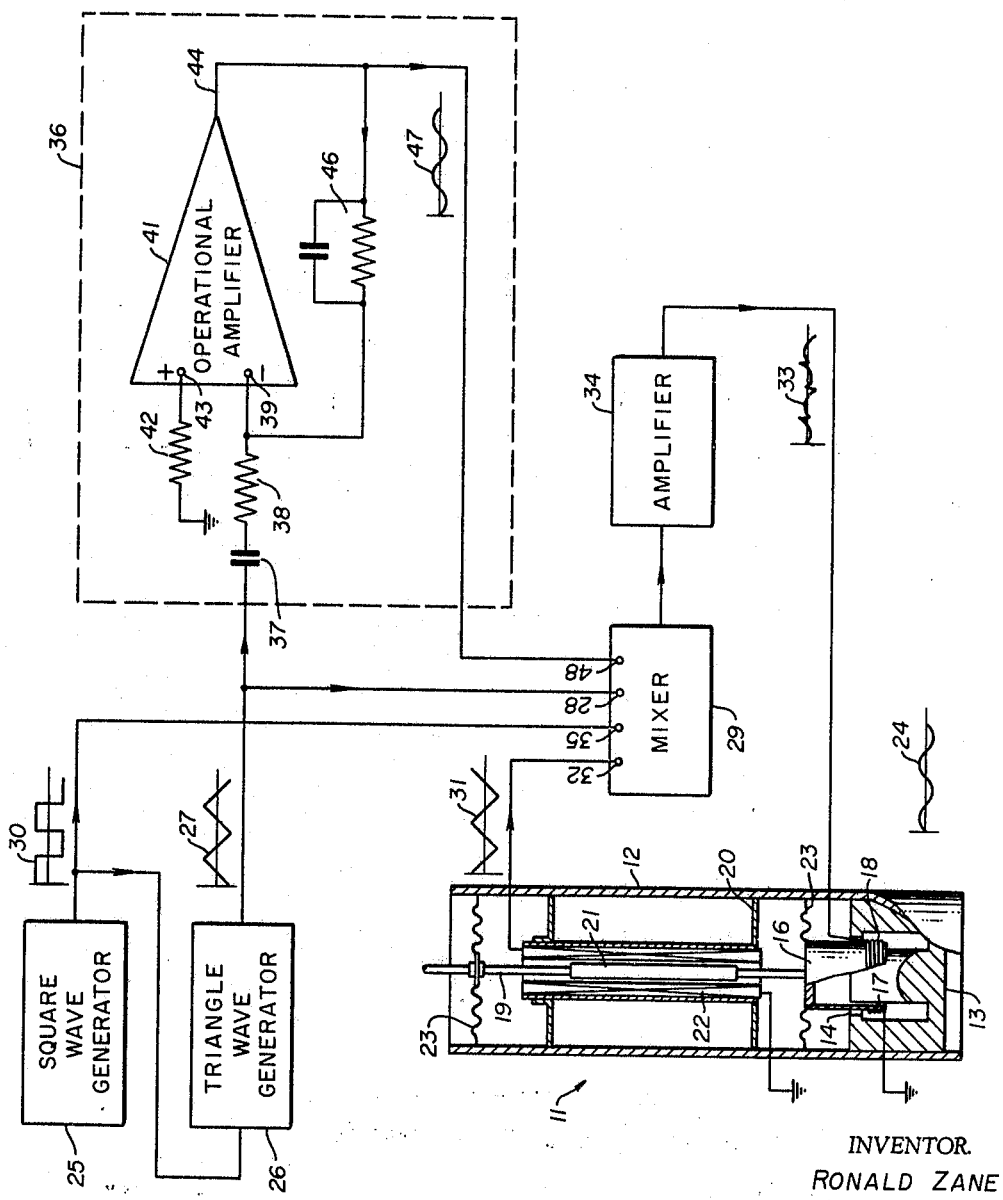

3,486,094
CIRCUITRY FOR OBTAINING PRECISELY CONTROLLABLE MOTION IN A MOVING COIL ACTUATOR
Ronald Zane, Richmond, Calif., assignor to the United States of America as represented by the United States Atomic Energy Commission
Filed Nov. 2, 1966, Ser. No. 591,656
Int. Cl. H02k 33/10
U.S. Cl. 318—128                                      4 Claims

ABSTRACT OF THE DISCLOSURE

A rod supported with flexible spiders and reciprocally driven at a velocity having a linear rate of change by a coil in a permanent magnetic field. The coil is energized simultaneously with phase synchronized sine waves, square waves, and error feedback signals. The sine waves cancel the natural harmonic variations of the spiders; the square waves drive the rod at a linear rate of change velocity; and the error signals cancel rod motion that deviates from a linear rate of change velocity reference.

---

This invention relates generally to motion generating apparatus and particularly to an electro-mechanical device for providing accurately controllable reciprocal motion. The invention described herein was made in the course of, or under Contract W–7405–eng–48 with the Atomic Energy Commission.

The invention was developed for measuring Mossbauer absorption spectra. To make such measurement, a gamma ray source or absorber is moved at a carefully controlled rate. The relative physical motion between the gamma source and the absorber modulates the energy of the emitted gamma rays by the Doppler effect. The relative count rates of the energy modulated rays are indicative of the hyperfine nuclear structure of the material. For best results, the relative velocity between the gamma source and the absorber must be very accurately controlled. In usual practice, either the gamma source or the absorber is in a fixed position and the other is moved relative thereto.

The present invention is an improved apparatus for obtaining such accurately controlled motion, utilizing a driver similar to that used in a loudspeaker to provide the physical motion and including special circuitry for supplying the correct waveform of current to the driver to provide a linear rate of velocity change.

It is generally relatively simple to generate a drive signal with the exact shape which should, in theory, define the physical motion which is desired. However the driver unit has a natural harmonic frequency resulting from the mass of the movable portion of the driver and the restraining forces applied by elastic spider supports in the driver. If conventional drive circuitry is used, the effect of such natural harmonic motion prevents the movable portion of the driver from being driven precisely in accordance with an input drive signal. In the present invention, a compensating signal is synthesized and mixed with a driving signal to cancel the natural harmonic motion. Thus, the movement of the driver can more accurately respond to a reference drive signal. Also, in the present circuit a velocity feedback signal is obtained from the driven unit and compared with the reference signal. Any difference between the feedback signal and the reference signal is then applied through a closed loop to the driver as an error correcting signal. Such error signal has a large square wave component. In the present invention a square wave signal is injected from an external source to replace the square wave component of the error signal which would otherwise result from the differences between the feedback signal and reference signal. Thus, the feedback signal can be made to be nearly identical to the reference signal and consequently, the motion of the driver more accurately follows the desired motion.

Thus it is an object of the present invention to provide an improved means for obtaining accurately controllable reciprocal motion.

It is another object of the present invention to provide a new means for eliminating positional distortion resulting from natural harmonic motion in a physical body.

It is another object of the present invention to provide a means for very closely coordinating the shape of a feedback signal with a reference signal.

The invention, together with further objects thereof, will be best understood by reference to the accompanying drawing which is a block diagram of the circuit of the invention and a partial section view of a driver unit.

Referring now to the single figure of the drawing, there is shown a driver assembly 11 of a type similar to that used in loudspeakers in which there is provided a cylindrical housing 12 for supporting therein a permanent magnet 13 having an annular gap 14. A cylindrical drive piston 16 has an end 17 extending within the gap 14 and has a drive coil 18 thereon. The drive coil 18 provides an accelerating force related to the current passing through it. The piston 16 attaches to a rod 19 which transmits motion to an object to be moved such as a source of radiation or an absorber (not shown).

A magnet 21 is affixed to the rod 10 and moves therewith, the magnetic field from the magnet including a potential in a velocity feedback coil 22. A coil form 20 provides a means for mounting and securing the coil 22 to the housing 12. The piston 16 and the rod 19 are flexibly supported and radially secured to the housing 12 by a pair of flexible spiders 23, such spiders providing minimum lateral physical restraint on the rod with strong radial support.

In an example of a typical usage of the apparatus, it is desired that the rod 19 be physically displaced as indicated in the parabolic waveform 24 wherein time is taken along the abscissa or horizontal axis and displacement of the rod is taken on the ordinate or vertical axis. All the remaining waveforms shown are taken on the same time scale as waveform 24 but with voltage amplitude taken on the vertical axis. In order to produce such a parabolic displacement, a signal generator 26 is provided to produce a triangularly shaped reference signal 27. A square wave phase control signal 30 for the triangle wave generator 26 is obtained from a square wave generator 25. A further purpose for square wave generator 25 will be discussed hereinafter. The triangle signal 27 is applied to one input terminal 28 of a mixer circuit 29. An example of one type of mixer circuit suitable for use as mixer circuit 29 is shown by R. Zane "Mössbauer Effect Velocity Drive Linearized by Shape Correction," Nuclear Instruments and Methods, 00 (1966) 000–000, North-Holland Publishing Co., page 740–1. A waveform 31 having an amplitude proportional to the instantaneous velocity of rod 19 is generated in the coil 22 by the motion of magnet 21. Such velocity waveform 31 is applied to an input terminal 32 of mixer 29 and 180° out of phase with the reference signal 27. The reference signal 27 has a shape precisely following the desired velocity characteristic. The feedback signal 31 is mixed with the reference signal 27 and a resultant drive signal 33 is amplified in an amplifier 34 and applied to the drive coil 18. Such drive signal 33 is the resultant of any differences between the reference signal 27 and the velocity signal 31.

If drive signal 33 is analyzed it will be found to contain various components, one major component being a square wave which would ordinarily be produced as a portion of the error signal resulting from combining reference signal 27 and the velocity feedback signal 31. A square wave component in drive signal 33 is necessary to drive the rod 19. However, for highest accuracy, it is very desirable that the velocity feedback signal 31 exactly cancel the reference signal 27 and that no error or difference signal be produced. In the present invention, the requirments of the two above-described conflicting situations are both met by applying a portion of the separately generated square wave signal 30 to a third input terminal 35 of mixer 29, thereby providing the necessary square wave component for drive signal 33 while velocity feedback signal 31 can be made to more nearly match reference signal 27.

In principle, the drive coil 18 could be accelerated with only a square wave of current to produce a triangular velocity waveform and a parabolic displacement $$\frac{\delta^2 x}{\delta t^2} = AI \sum_{n=1}^{\infty} B^{-1} \sin (Bt)$$

where A is a proportionality constant; $B=(2n-1)$; $n$=integer; $t$=time; $x$=linear displacement; and I is the absolute value of the current amplitude. The velocity would be simply the integral of acceleration $$\frac{\delta x}{\delta t} = -AI \sum_{n=1}^{\infty} B^{-2} \cos (Bt)$$

and the integral of the triangular velocity waveform would be a parabolic displacement $$x = -AI \sum_{n=1}^{\infty} B^{-3} \sin (Bt)$$

However, in the operation of the circuit as described up to this point, it has been found that the velocity waveform 31 is nonlinear with respect to the inverse of waveform 27, even with the gain of amplifier 34 raised to the critical damping limit. The nonlinearity of waveform 31 results from the fact that the rod 19 is suspended by the flexible spiders 23. The spring constant of the spiders coupled to the mass of the moving system constitutes a simple harmonic oscillator with resonant frequency, $\omega_0$. The response of such a simple closed loop system is approximately $$\frac{\delta x}{\delta t} = -AI \left[ \sum_{n=1}^{\infty} B^{-2} \cos (Bt) - K \sin (\omega_0 t) \right]$$

where K is a constant related to the "Q" of the simple harmonic oscillator and the loop gain of the system. In addition it is assumed that the driving frequency $\omega$ is nearly equal to the resonant frequency $\omega_0$, that is to say, $\omega = \omega_0 = 2\pi f$. In order to obtain a triangular velocity wave the drive waveform needs to contain a square-wave component and a sinusoidal component capable of cancelling the sin $\omega_0 t$ term contributed by the simple harmonic oscillator.

If the system were operated at the resonant frequency of the electro-mechanical drive, the drive waveform necessary to produce a triangular velocity wave would be $$\frac{\delta^2 x}{\delta t^2} = AI \left[ \sum_{n=1}^{\infty} B^{-1} \sin Bt - K \sin \omega_0 t \right]$$

The first term of the preceding equation is the square acceleration wave which produces the triangular velocity component, and the second term cancels the simple harmonic oscillation component of the motion. In practice it was found unnecessary to produce a true sinusoid as a correction term. Instead, it was found that integration of the reference triangle wave 27 produced a parabolic term which sufficed for a first-order correction and was readily available and inherently synchronous with the triangle wave. The acceleration term thus is $$\frac{\delta^2 x}{\delta t^2} = AI \left[ \sum_{n=1}^{\infty} B^{-1} \sin Bt - K' \sum_{n=1}^{\infty} B^{-3} \sin Bt \right]$$

To obtain such a correction term necessary for linearizing the velocity of the rod 19, a wave generator 36 is provided. An example of circuitry which might be utilized in such a generator is shown. The reference signal 27 is applied through a series connected capacitor 37 and resistor 38 to a first input terminal 39 of an operational amplifier 41 connected as an integrator. A resistor 42 is connected from ground to a second, differential input terminal 43 of the operational amplifier 41. Negative feedback is provided from the output 44 of the operational amplifier 41 to the first input terminal 39 through a parallel connected resistor and capacitor combination 46. The values of the various circuit components are selected so that a cancellation signal 47 is produced having a parabolic shape. Such signal 47 is applied to a fourth input terminal 48 of mixer 29 and is therein combined with reference signal 27 and velocity signal 31.

Thus, in the operation of the apparatus, a square wave 30 and a parabolic wave 47 are produced, the square wave driving the drive coil 18 and the parabolic wave cancelling the spring constant of the spiders 23. Thus, the velocity feedback signal 31 can be made to be nearly identical to the inverse of reference signal 27. Any slight remaining differences between velocity signal 31 and reference signal 27 are largely cancelled by negative feedback through the closed loop formed by mixer 29 and amplifier 34 back to drive coil 18.

In a typical embodiment of the invention, the circuit was operated at a frequency of twenty-five cycles per second.

It will be obvious to those skilled in the art that many variations are possible within the spirit and scope of the invention and it is not intended to limit the invention except as defined in the following claims.

What is claimed is:
1. In a circuit for providing precisely controllable reciprocal motion at a linear rate of velocity change to a movable element along a line, the combination comprising:
(a) a driver mechanism for said movable element and of the class having a resilient means supporting said movable element and providing with said movable element a natural harmonic restraining force along said line on said movable element and having a drive coil for magnetically producing motion of said movable element,
(b) a square wave signal generator coupled to said drive coil for driving said movable element at a linear rate of velocity change, and
(c) a force cancelling signal synthesizing circuit having an output signal coupled to said drive coil and tending to cancel said restraining force, said output signal having a shape approximating a sine wave.

2. The combination of claim 1 wherein said force cancelling signal synthesizing circuit is an integrating circuit having a parabolic shaped output signal.

3. The combination of claim 1 further including a triangle wave signal generator, a velocity transducer coupled to said moving element and of the class producing an output velocity signal potential having an amplitude proportional to the velocity of said moving element, and means for comparing a signal from said triangle wave signal generator with said output potential from said velocity transducer and providing an output error signal proportional to the difference therebetween, said output error signal being applied to said drive coil.

4. The combination of claim 3 wherein output signals from said square wave generator are coupled to said triangle wave generator to synchronize the phases of output signals from said square wave and triangle wave generators, and output signals from said triangle wave generator are coupled to said force cancelling signal synthesizing circuit to synchronize the phases of output signals from said triangle wave generator and said force cancelling signal synthesizing circuit.

References Cited

UNITED STATES PATENTS

| | | | |
|---|---|---|---|
| 2,445,014 | 7/1948 | Wolff | 318—132 |
| 2,776,560 | 1/1957 | Erath et al. | 73—71.2 |
| 2,853,667 | 9/1958 | Booth et al. | 318—127 |
| 2,860,183 | 11/1958 | Conrad | 179—1 |
| 3,047,661 | 7/1962 | Winker | 179—1 |
| 3,088,062 | 4/1963 | Hudimac | 318—128 |

FOREIGN PATENTS 23,815  9/1962  Germany.

MILTON O. HIRSHFIELD, Primary Examiner

D. E. DUGGAN, Assistant Examiner

U.S. Cl. X.R.

310—27; 318—133